United States Patent [19]

Kasserra et al.

[11] 4,080,420

[45] Mar. 21, 1978

[54] LEACHING OF TUNGSTEN VALUES FROM TRI (ALKALINE EARTH METAL) TUNGSTATE

[75] Inventors: Hans Peter Kasserra, Brockville; Denis Bertram Kelly, Mallorytown; Isaac Obadia, Kingston, all of Canada

[73] Assignee: Du Pont of Canada Ltd., Montreal, Canada

[21] Appl. No.: 766,423

[22] Filed: Jan. 27, 1977

[30] Foreign Application Priority Data

Jan. 29, 1976 Canada .................................. 244544

[51] Int. Cl.[2] ............................................ C01G 41/00

[52] U.S. Cl. ........................................ 423/55; 423/53; 423/56; 423/58; 423/61; 423/593; 423/606; 75/97 R; 75/101 R; 75/103; 75/121

[58] Field of Search ...................... 423/53, 56, 58, 61, 423/606, 55, 593; 75/47 R, 101 R, 103, 121

[56] References Cited

U.S. PATENT DOCUMENTS

| | | | |
|---|---|---|---|
| 1,388,857 | 8/1921 | Giles | 423/58 |
| 2,394,362 | 2/1946 | Burwell et al. | 423/58 |
| 3,429,693 | 2/1969 | Bauer et al. | 423/61 |
| 3,510,291 | 5/1970 | Brush | 423/606 |
| 3,717,697 | 2/1973 | Gillchriest et al. | 423/53 |

FOREIGN PATENT DOCUMENTS

| | | | |
|---|---|---|---|
| 494,947 | 10/1938 | United Kingdom | 423/53 |

*Primary Examiner*—Herbert T. Carter

[57] ABSTRACT

A process is provided for treating tri (alkaline earth metals) tungstates with an aqueous solution containing cations selected from ammonium, sodium and potassium ions and mixtures thereof, and anions selected from hydroxide, carbonate, bicarbonate, and phosphate ions and mixtures thereof, to form a tungstate salt which is soluble in the solution and an alkaline earth metal compound which is insoluble in the solution. The tri (alkaline earth metal) tungstate can be prepared from iron tungstate, manganese tungstate, and/or an alkaline earth metal tungstate or from ores or concentrates of these tungstates, by a high temperature treatment with an alkaline earth metal donor compound, such as calcium oxide. A preferred soluble tungstate is ammonium tungstate, which can be further processed to yield tungsten trioxide and/or tungsten.

7 Claims, No Drawings

LEACHING OF TUNGSTEN VALUES FROM TRI (ALKALINE EARTH METAL) TUNGSTATE

BACKGROUND OF THE INVENTION

1. Field of the Invention

This invention relates to a process for preparing soluble tungstate salts from tungstates of alkaline earth metals. More particularly, the invention concerns a process for preparing ammonium tungstate from tri (alkaline earth metal) tungstates, especially from tricalcium tungstate.

2. Prior Art

Various tungsten compositions are known in the art. Calcium forms a tungstate mineral known as scheelite ($CaWO_4$). Calcium also forms a tricalcium tungstate of the formula $Ca_3WO_6$. Iron and manganese form a range of tungstate minerals varying in composition between $FeWO_4$ and $MnWO_4$. These minerals are generally referred to as ferberite, wolframite and huebnerite, depending on the composition of the mineral. Generally, ferberite is used to describe such a mineral containing more than 20% by weight of FeO and huebnerite, when the mineral contains more than 20% by weight of MnO. The intermediate compositions are referred to as wolframite, although this term is often used for the whole range of compositions; such use may be made hereinafter. These various minerals and tungsten compositions are important sources of tungsten trioxide and metallic tungsten.

In conventional processes for recovering tungsten values from scheelite or from wolframite ores, the ores are usually concentrated by gravity, magnetic and/or flotation techniques. The concentrates, so formed, are then processed further. For example, water soluble sodium tungstate can be obtained by fusing a concentrate with sodium carbonate or by contacting a concentrate with hot sodium hydroxide solution. Acidification of the aqueous sodium tungstate solution yields insoluble tungstic acid. Alternatively, tungstic acid can be obtained from the concentrate by leaching the concentrate with a strong acid, such as concentrated hydrochloric acid. The tungstic acid can then be dissolved in a base and processed further to recover other tungsten values.

Frequently ammonium tungstate is formed in known processes as an intermediate, which is then isolated, dried and heated to form tungsten trioxide. The ammonium tungstate is believed to be the paratungstate salt, which may be defined as having the formula $x(NH_4)_2O.yWO_3.zH_2O$ with, for example, $x=3$ and $y=7$ or $x=5$ and $y=12$, the value of $z$ depending on the conditions of crystallization of the salt. This intermediate can be formed by dissolving tungstic acid in ammonium hydroxide, and subsequently can be converted to tungsten trioxide, tungsten and other useful tungsten compounds by techniques such as those described in K. C. Li and C. Y. Wang, "Tungsten", American Chemical Society Monograph 130, Reinhold Publishing Corporation, New York (1955), especially Chapter IV.

Each of the above-described processes is useful for extracting tungsten values from various tungsten compositions. However, lower levels of impurities in products produced with good yields are technically and economically desirable. For example, ammonium tungstate manufactured by known processes is susceptible to contamination by impurities. The concentration of such impurities depends at least in part on the actual process conditions employed in the manufacture of the ammonium tungstate and on the composition of the tungsten ore.

SUMMARY OF THE INVENTION

To achieve at least some of the aforementioned desired decrease in impurities while obtaining good yields, the present invention provides a process for the manufacture of a tungstate salt which comprises treating a tri (alkaline earth metal) tungstate with an aqueous solution containing cations selected from the group of ammonium, sodium and potassium ions and mixtures thereof and anions selected from the group consisting of carbonate, bicarbonate, hydroxide and phosphate ions and mixtures thereof, at a temperature in the range of 10° C to the boiling point of the aqueous solution, for a time sufficient for the cations to react with the tri(alkaline earth metal) tungstate to form a tungstate salt which is soluble in the solution and for the anions to react with the tri (alkaline earth metal) tungstate to form an alkaline earth metal compound which is insoluble in the solution. The alkaline earth metal of the tri (alkaline earth metal) tungstate can be selected from the group consisting of calcium, barium, strontium and mixtures thereof, but is preferably calcium. Preferably, the cations are ammonium ions and the anions are carbonate and/or bicarbonate ions. In a preferred embodiment, these cations and anions are formed by passing ammonia and carbon dioxide through the solution, which preferably is maintained at a temperature between about 20 ° and 40° C.

In an embodiment of the invention, the soluble tungstate, preferably ammonium tungstate, is converted to tungsten trioxide, which in turn can then be converted to metallic tungsten.

In another embodiment of the invention, the tri (alkaline earth metal) tungstate is prepared from a tungsten composition selected from the group consisting of iron tungstate, manganese tungstate, calcium tungstate, strontium tungstate, barium tungstate and mixtures thereof, or from ores or concentrates thereof, by calcining the tungsten composition with an alkaline earth metal donor compound, preferably calcium oxide, at a temperature in the range of 800° to 1400° C, the donor compound being in excess of the stoichiometric amount required to convert the tungsten composition to the tri (alkaline earth metal) tungstate.

Detailed Description of the Invention

As used herein, with respect to tri (alkaline earth metal) tungstates and alkaline earth metal donor compounds, the term "alkaline earth metal" includes calcium, strontium and barium, but not beryllium, magnesium and radium. The invention will be described generally hereinafter with reference to calcium as the sole alkaline earth metal. Although calcium is the preferred alkaline earth metal, it can be replaced in whole or in part with strontium and/or barium. The tri (alkaline earth metal) tungstate may contain more than one alkaline earth metal and, if so, it is preferred that one of the alkaline earth metals is calcium.

The present invention concerns the manufacture of a soluble tungstate salt, especially ammonium tungstate, from tri (alkaline earth metal) tungstate, especially tricalcium tungstate. The tricalcium tungstate may be in a relatively pure form or it may be admixed with other materials in the ore or concentrate from which it has been manufactured. For example, tricalcium tungstate can be obtained by heating tungsten trioxide or calcium tungstate with calcium carbonate. Tricalcium tungstate can also be obtained from iron or manganese tungstates, or mixtures thereof, by heating these tungstates with a suitable calcium donor salt. Preferred techniques for manufacturing tricalcium tungstate from various tungsten ores and concentrates are described in more detail hereinafter.

In the process of the present invention tricalcium tungstate is contacted, i.e., leached, with an aqueous solution that is capable of both leaching the tungsten into solution and preventing its precipitation as calcium tungstate. The aqueous solution contains cations selected from the group consisting of the ammonium ion and alkali metal cations, especially sodium and potassium, and mixtures thereof. The ammonium ion can be formed at least in part by passing ammonia gas through the solution. The aqueous solution also contains anions selected from the group consisting of hydroxide, carbonate, bicarbonate and phospate ions and mixtures thereof. For example, the phosphate anions can be orthophosphate anions. The anions can be added as salts of the cations. The carbonate and bicarbonate anions, which as preferred, can be formed by passing carbon dioxide through the solution. To prevent precipitation of calcium tungstate, at least one of the anion groups is capable of forming an insoluble calcium compound and these anions are in a concentration such that the insoluble compound is less soluble in the solution than calcium tungstate. If precipitation of calcium tungstate were to occur, a significant fraction of the tungsten would not be leached into solution, thereby causing a loss of tungsten and/or a necessity for additional process steps to recover tungsten from the insoluble calcium tungsten. The principles of preferential precipitation of the insoluble calcium compound are understood by those skilled in the art. In the process, tungsten is leached into solution as a soluble tungstate. Tungsten, especially in the form of ammonium tungstate, or related compounds, can be recovered from the solution of soluble tungstate.

A preferred cation in the leaching solution is the ammonium cation. Aqueous ammonium carbonate solution is a preferred leaching solution. The leaching can be carried out in the presence or absence of oxygen, which, if present, can be in the form of air.

In the preferred ammonium carbonate leaching system, ammonium carbonate will usually be used in amounts approaching its solubility limit in the aqueous leaching solution at the temperature of the solution. Less concentrated solutions, however, can be used. Typical solutions will contain about 20 to 30 percent by weight of ammonium carbonate, based on the weight of the water solvent, and have a pH in the range of 8–11, especially when in the presence of a stoichiometric excess of ammonia.

It is preferable to agitate the solution to improve the contact of the leaching solution with tricalcium tungstate. Depending on the material being leached, typical leaching times vary from 30 minutes to 20 hours. The temperature at which the leaching step is carried out is generally in the range from 10° C to the boiling point of the solution, and preferably in the range 20°–40° C. Although feasible, leaching at lower temperatures may be uneconomically slow. At higher temperatures difficulties may be experienced in maintaining the desired concentration of ammonia in solution. When ammonia is used, ammonium tungstate, the preferred product, is obtained. Ammonium tungstate is soluble in the ammonia solution under the treatment conditions. The ammonium tungstate can be readily separated from insoluble matter in the leaching system by, for example, filtration and/or centrifugation techniques.

If the tungstate is in the form of the ammonium salt, the ammonium tungstate can be obtained from the solution after separation of the insoluble matter, by, for example, evaporating the water. If the cation is, for example, sodium, the soluble sodium tungstate formed can be converted to tungstic acid by the addition of hydrochloric acid and then to ammonium tungstate by the addition of ammonium hydroxide. Such a conversion of sodium tungstate to ammonium tungstate is known.

The ammonium tungstate can be recrystallized, if necessary, to reduce the level of impurities to that desired. The ammonium tungstate can be converted to tungsten trioxide by heating the ammonium tungstate. Subsequently, the tungsten trioxide can be reduced to metallic tungsten. Such techniques are known and are described in more detail in the aforementioned Li and Wang reference.

Optimum conditions for achieving maximum leaching rates with high levels of recovery of tungsten, depend on a number of variables, such as particle size of the tricalcium tungstate, temperature, rate of agitation and concentration of the solutions, as is understood by those skilled in the art.

The impurities in the tricalcium tungstate can be a factor in determining the preferred cation for the leaching step. Generally, the type of impurities depends on the source of the tricalcium tungstate. For example, the type of the impurities depends on whether the tricalcium tungstate was formed from scheelite or wolframite ores or concentrates and on the technique used to obtain tricalcium tungstate therefrom.

The ammonium cation is, in general, the preferred cation but under some circumstances another cation may be preferred. For example, if the ore or concentrate contains signficant amounts of copper compounds, leaching the tricalcium tungstate with ammonia solutions can result in the formation of undesirable copper-ammonia complexes which are soluble in the solution. In such cases, it is preferable to leach with solutions having alkali metal cations and, if desired, to obtain ammonium tungstate by, for example, acidification of the alkali metal tungstate solution to form insoluble tungstic acid and then redissolution with ammonia solution. Techniques for the separation of soluble copper-ammonia complexes from ammonia solutions are known. When the cation is an alkali metal cation material admixed with the tricalcium tungstate, impurities such as silica, alumina and/or compounds derived from silica, alumina, zinc and tin, if present, could be dissolved in the leach step, thereby contaminating the leach solution. If the ore or concentrate contains molybdenum in the form of a molybdate, such as calcium molybdate and/or the mineral powellite, or molybdenum sulfides, such as molybdenite, the molybdenum in the tricalcium tungstate product formed from the ore or concentrate may be in a form that is leachable as soluble ammonium molybdate. However, if a concentrate is used in the manufacture of tricalcium tungstate, the amounts of the copper or molybdenum compounds can be reduced to a level at which the formation of soluble ammonium molybdate and/or soluble copper-ammonia complexes during leaching is not a major problem.

Some impurities which may be present in the ores or concentrates, such as aresenic and/or sulphur compounds, may result in problems in purification of leach solutions. Under such circumstances, it is desirable to treat such ores or concentrates for the removal of such impurities prior to calcining with alkaline earth metal donor compounds, for example, by roasting as is known to those skilled in the art.

It is sometimes desirable to carry out the steps in the processes of the present invention in the presence of oxygen. Under such conditions oxidation of impurities may occur which may make the impurities less soluble during the leaching step of the process.

The process of the present invention may be operated as a batch or as a continuous process, or a mixture thereof, as each step of preferred embodiments of the process described herein may be operated in a batch or continuous manner. The process is usually operated throughout at atmospheric pressure, although superatmospheric pressures may be used, if desired.

As stated above, tricalcium tungstate can be formed by a number of different techniques. The tungsten-containing materials that can be used include scheelite and wolframite ores or their concentrates, synthetic scheelite, tungsten oxides, tungstic acid, ammonium tungstate and other tungstates. The synthetic scheelite, tungsten oxides, tungstic acid and ammonium tungstate may be obtained, for example, from other processes for the separation of tungsten compounds from its ores or concentrates. Thus, the process of the present invention can be used in the purification of tungsten compounds obtained by other techniques.

In a preferred embodiment, the tungsten-containing compound is a scheelite and/or wolframite ore or concentrate. Tricalcium tungstate can be obtained by mixing, preferably in an intimate manner, the tungsten-containing compound with a suitable calcium donor compound and then calcinating the mixture by heating to 800°-1400° C, preferably 1000°-1200° C, in an inert atmosphere or in the presence of air for 1-12 hrs, for example. The optimum calcining conditions depend on a number of variables, such as temperatures, particle size of the ore or concentrate and any compounds added thereto, and the type of alkaline earth metal donor compound, as is understood by those skilled in the art. The temperature is preferably below that at which fusion or sintering of the mixture occurs, otherwise regrinding of the mixture may be necessary prior to leaching.

Suitable calcium donor compounds are, for example, calcium oxide, hydroxide, nitrate or carbonate and limestone and dolomite, and mixtures thereof. Other heat-labile calcium salts, as well as similar salts of other alkaline earth metals, are also suitable. Such calcium donor compounds may be present in the ore or concentrate or may be added thereto. The quality of the calcium compounds is preferably such that significant amounts of impurities, especially impurities that may be leachable in the process for leaching tricalcium tungstate, are not introduced into the tricalcium tungstate that is formed in the calcination process. Usually, we avoid introducing magnesium salts into the tungstate ore or concentrate, because on calcining, tri (magnesium/alkaline earth metal) tungstates can form and such tungstates are not readily leachable in the subsequent process steps. However, if magnesium is introduced, for example as dolomite, an excess of calcium is also used so that tricalcium tungstate and not tri (calcium, magnesium) tungstate is formed. It is believed that tricalcium tungstate is formed preferentially under such conditions.

In the calcining of iron and manganese tungstates, it is preferable to use a stoichiometric excess of the calcium donor compound. Failure to use an excess can result in the formation of tungstates (e.g., calcium/iron tungstates) which are believed not to be leachable in the process of the present invention, thereby resulting in a loss of tungsten. With an excess of calcium, tricalcium tungstate and calcium-iron compounds (e.g., calcium ferrite) are formed. Only the tricalcium tungstate is believed to be leachable. Calcination of scheelite in the presence of less than the stoichiometric amount of calcium donor compound will result in incomplete conversion of calcium tungstate to tricalcium tungstate.

Tricalcium tungstate may also be obtained by the reduction of calcium tungstate, e.g., scheelite, or mixtures capable of forming calcium tungstate, at high temperatures. The products of the reduction process include tricalcium tungstate and finely divided metallic tungsten, the ratio of tricalcium tungstate to metallic tungsten depending on the extent of reduction. While the tricalcium tungstate is leachable in the leaching process described hereinabove, the finely divided metallic tungsten is not believed to be readily leachable in the absence of an oxidizing agent. A process for the treatment of mixtures of tricalcium tungstate and finely divided metallic tungsten is described in copending application in the name of H. P. Kasserra having the same convention priority date as the present application.

Tricalcium tungstate decomposes in water giving calcium tungstate. Tricalcium tungstate also decomposes slowly in moist air, but is believed to be stable in dry air. It is, therefore, desirable to leach the tricalcium tungstate shortly after its formation and/or to protect the tricalcium tungstate from the effects of water until leaching is commenced.

The process of the present invention provides a method, which employs relatively inexpensive materials, for the manufacture of tungsten or tungsten compounds at potentially economical rates and levels of tungsten recovery. The process is substantially pollution-free; contaminants in effluent streams from the process may be treated by known techniques, if necessary, to remove any pollutants. As the process is operated under relatively mild conditions, the tungsten compounds obtainable are less susceptible to contamination by impurities. Furthermore, if ammonia and/or carbon dioxide are used in the leaching step, these materials can be recovered subsequently and recycled to the leaching step.

The present invention is illustrated by the following examples.

EXAMPLE I

A 25.0—g sample of commercial scheelite concentrate containing 77.2% by weight of tungsten trioxide was mixed with 48.0—g of synthetic barium oxide in a roll mill jar for one hour. The approximate molar ratio of barium to tungsten was 3.75:1. The mixture was then calcined (roasted) for two hours in a muffle furnace at 1200° C. The calcined product was analyzed by X-ray diffraction and found to be mainly dibarium calcium tungstate ($Ba_2CaWO_6$). No unreacted scheelite was detected. Hydrated barium hydroxide [$Ba(OH)_2 \cdot H_2O$] was also shown to be present suggesting that the calcined product was hygroscopic.

A 20—g sample of the calcined product was leached at ambient temperature with 200 ml of an ammonium carbonate solution containing approximately 180 g ammonia and 123 g carbon dioxide per liter. The leach was carried out for four hours in a roll mill jar containing a ceramic grinding medium. The resultant slurry was then filtered, and the solid residue obtained was washed with saturated ammonium carbonate solution. Analysis of the solid residue by X-ray fluorescence showed that 95.8% of the tungsten in the calcined product has been leached.

EXAMPLE II

The calcining and leaching procedure of Example I was repeated using 32.4 g of synthetic strontium oxide instead of the barium oxide, the approximate molar ratio of strontium to tungsten being 3.75:1. Analysis of the calcined product by X-ray diffraction showed that it was mainly distrontium calcium tungstate ($Sr_2CaWO_6$), the excess strontium being present as strontium oxide. The leaching procedure leached 54.7% of the tungsten from the calcined product. X-ray diffraction analysis of the leached starting material (i.e., leached calcined product) showed the presence of unleached distrontium calcium tungstate due to incomplete leaching with the procedure used.

EXAMPLE III

This example illustrates the preparation of a tri (alkaline earth metal) tungstate from various tungsten-bearing materials. Except as otherwise noted, the prepared tri (alkaline earth metal) tungstate is suitable for use in the process of the invention. The tri (alkaline earth metal) tungstate is prepared from calcium tungstate in part (a), from mangenese tungstate in part (b), from iron tungstate in part (c), and from various tungsten-ore concentrates in part (d). Part (e) shows the preparation of the tri (alkaline earth metal) tungstate with various alkaline earth metal donor compounds and part (f) illustrates the use of excess donor compound in overcoming the undesirable effects of magnesium in the preparation of the tri (alkaline earth metal) tungstate.

Part (a)

A 397—g sample of synthetic calcium tungstate were mixed with 290 g of synthetic calcium carbonate in a roll mill jar for 90 minutes. The approximate molar ratio of calcium to tungsten was 3.1:1. Approximately 70 g samples of the resultant mixture were calcined in a muffle furnace and the calcined product obtained was analyzed by X-ray diffraction for major products.

The results obtained were as follows:

| Calcining Temperature (° C) | Calcining Time (hours) | Analysis | | | |
|---|---|---|---|---|---|
| | | $CaWO_4$ | $Ca_3WO_6$ | $CaCO_3$ | CaO |
| 800 | 1 | yes | yes | yes | yes |
| 800 | 5 | yes | yes | no | yes |
| 800 | 16 | yes | yes | no | yes |
| 1000 | 1 | yes | yes | no | yes |
| 1000 | 5 | no | yes | no | yes |
| 1000 | 16 | no | yes | no | yes |
| 1200 | 1 | no | yes | no | yes |
| 1200 | 5 | no | yes | no | yes |
| 1200 | 16 | no | yes | no | yes |

Part (b)

A 10.0—g sample of synthetic manganese tungstate was mixed with 13.9 g of synthetic calcium carbonate in a roll mill jar. The approximate molar ratio of calcium to tungsten was 4.2:1. The mixture was then calcined in a muffle furnace at 1200° C for four hors. Analysis by X-ray diffraction showed a high conversion of manganese tungstate to tricalcium tungstate with a compound tentatively identified as calcium manganese oxide also being present.

Part (c)

A 61.5—g sample of synthetic iron tungstate was mixed with 90.1—g of synthetic calcium carbonate in a roll mill jar. The approximate molar ratio of calcium to tungsten was 4.44:1. The mixture was then calcined in a muffle furnace at 1200° C for four hours. Analysis by X-ray diffraction showed a high converson of iron tungstate to tricalcium tungstate with a compound tentatively identified as calcium iron oxide being present.

Part (d)

Samples of a tungsten-containing concentrate ground to −250 TYLER mesh were mixed with laboratory grade calcium carbonate in a roll mill jar for two hours. A sample of the resultant mixture was calcined in a muffle furnace at 1200° C. for four hours. All samples calcined weighed 220–350 g except that for Run 7 (see below) which weighted 2490 g. X-ray diffraction analysis of the calcined products showed a high conversion to tricalcium tungstate. Further experimental details and the results obtained are given in the following Table.

| Run | Type of Concentrate* | Origin | Grade (%)** | | Ratio of Ca:W*** |
|---|---|---|---|---|---|
| | | | $WO_3$ | FeO | |
| 1 | Scheelite | Canada | 77.2 | 0.23 | 3.1 |
| 2 | Scheelite | Thailand | 77.8 | 0.26 | 3.2 |
| 3 | Scheelite | Bolivia | 43.5 | 1.4 | 4.0 |
| 4 | Scheelite | U.S. | 63.2 | 1.0 | 3.8 |
| 5 | Ferberite | Rwanda | 68.6 | 24.1 | 4.4 |
| 6 | Wolframite | Bolivia | 62.3 | 20.8 | 5.0 |
| 7 | Wolframite | unknown | 74.0 | 18.5 | 4.6 |

*The scheelite of Run 4 was a commercial synthetic scheelite
**by weight. The scheelite of Run 3 also contained 18.8% barium and the wolframite of Run 7 also contained 4.4% manganese oxide
***approximate molar ratio

Part (e)

Approximately 25 g of a commercial scheelite concentrate containing 75.8% by weight of tungsten trioxide were mixed with an alkaline earth metal compound such that the mixture contained at least a 5 mole percent excess of the amount of alkaline earth metal required for the formation of the tri(alkaline earth metal) tungstate. The mixture was then calcined for two hours in a muffle furnace at 1200° C. The reaction product obtained was anaylzed for major products using X-ray diffraction.

The above procedure was repeated with several alkaline earth metal compounds. The results are given in the following Table. Runs 4–7 are included for comparisons; they are not of the invention.

| Run No. | AEM Donor[1] | AEM:W Ratio[2] | Product Analysis[3] | | |
|---|---|---|---|---|---|
| | | | $CaWO_4$ | $R_3WO_6$ | Other |
| 1 | CaO | 5.7 | None | $Ca_3WO_6$ | CaO |
| 2 | $Ca(OH)_2$ | 5.7 | None | $Ca_3WO_6$ | CaO |
| 3 | $BaCO_3$ | 3.1 | None | $Ba_2CaWO_6$ | $BaCO_3$ |
| 4 | $CaSO_4$ | 3.2 | Yes | None | $CaSO_4$ |
| 5 | $CaCl_2$ | 3.1 | Yes | None | $CaCl_2$ |
| 6 | $CaF_2$ | 3.3 | Yes | None | $CaF_2$ |
| 7[4] | $Ca_{10}(OH)_2(PO_4)_6$ | 3.1 | Yes | None | $Ca_3(PO_4)_2$ |

[1]Alkaline earth metal donor compound
[2]Ratio of alkaline earth metal to tungsten
[3]Major constituents of calcined product; $R_3WO_6$ = a tri(alkaline earth metal) tungstate
[4]The composition of AEM donor is approximate Part (f)

Samples of a commercial scheelite containing 75.9% by weight of tungsten trioxide were mixed with a high grade dolomite concentrate anaylzing 30.8% calcium oxide and 20.9% magnesium oxide, synthetic magnesium carbonate and/or synthetic calcium carbonate. The mixtures were then calcined in a muffle furnace at 1200° C and the products obtained were analyzed by X-ray diffraction. Details of the procedure and the results obtained are given in the following Table. The products of Runs 1 and 2 were readily leachable with ammonium carbonate solutions; in contrast, only a small fraction of the tungsten could be so leached from the product of Run 3.

| Run | 1 | 2 | 3** |
|---|---|---|---|
| Mixture | | | |
| scheelite (g) | 10.0 | 5.6 | 14.4 |
| dolomite (g) | 4.0 | 8.0 | |
| magnesium carbonate (g) | | | 5.0 |
| calcium carbonate (g) | 7.0 | | |
| Molar Ratio (approximate) | | | |
| calcium:tungsten | 3.8 | 3.4 | 1.07 |
| magnesium:tungsten | 0.63 | 2.3 | 1.25 |
| Calcining Time (min) | 60 | 30 | 30 |
| Analysis of Calcined Product* | | | |
| $CaWO_4$ | no | no | yes |
| $Ca_3WO_6$ | yes | yes | no |
| $MgCa_2WO_6$ | no | yes | no |
| CaO | yes | yes | no |
| MgO | no | yes | yes |

*analysis of major components. Magnesium tunsgtate ($MgWO_4$) was not detected.
**Run 3 is a comparison test, outside the invention.

EXAMPLE IV

In this example, tricalcium tungstate prepared in Example III, Part (a), at a 1200° C calcining temperature is leached in accordance with the invention. In each part of the example, the solutions were stirred during leaching, and after the leaching, the solutions were filtered, the residues were washed, and the filtrates were analyzed for tungsten by X-ray fluorescence analysis (except part (e) which employed atomic absorption analysis).

Part (a)

Samples of tricalcium tungstate weighing about 5 g each were added to 250 ml solutions of ammonium carbonate, through which 100 $cm^3$/min. of ammonia gas was being bubbled. Each solution contained approximately 90 g of carbon dioxide/liter. This leaching treatment was maintained for 15 minutes. Further experimental details and the results of the leaching were as follows:

| Temperature (° C) | Ammonia Concentration (approx.) (g/l) | Tungsten Leached (%) |
|---|---|---|
| Ambient (ca 24) | 250 | 88.2* |
| 50 | 175 | 76.8 |
| 75 | 80 | 75.8 |

*in a separate experiment the amount of tungsten leached was 93.9% after 30 minutes.

Part (b)

Samples of tricalcium tungstate weighing about 10 g each were added to 500 ml solutions of ammonium carbonate. The ammonia concentration was maintained at about 28% by bubbling ammonia through the solutions at 100 $cm^3$/min. This leaching treatment was maintained for 3 hours at ambient temperature. Further experimental details and the results of the leaching were as follows:

| Carbon Dioxide Concentration Initial (g/l) | Ratio* $CO_2$:$WO_3$ | Tungsten Leached (%) |
|---|---|---|
| 4.4 | 2.2** | 42.5 |
| 22 | 11 | 70.4 |
| 44 | 20 | 90.1 |
| 66 | 32 | 93.3 |

*approximate molar ratio
**carbon dioxide level insufficient to precipitate all of the calcium as calcium carbonate if leach was 100%. Stoichiometric ratio is 3:1. Calcium tungstate and tricalcium tungstate were present in leach residue (X-ray diffraction analysis).

Part (c)

Samples of tricalcium tungstate weighing about 10 g each were added to 500 ml solutions of ammonium carbonate containing about 66 g/l of carbon dioxide. This leaching treatment was maintained at ambient temperature for 15 minutes. Further experimental details and the results of the leaching were as follows:

| Ammonia Concentration Initial (g/l) | Ratio* $CO_2$:$WO_3$ | Tungsten Leached (%) |
|---|---|---|
| 50 | 34 | 98.3 |
| 120 | 35 | 98.2 |
| 185 | 32 | 90.5 |

*approximate molar ratio

Part (d)

Samples of tricalcium tungstate were added to 500 ml solutions of ammonium carbonate. This leaching treatment was maintained for 15 minutes at ambient temperature. Further experimental details and the results of the leaching are as follows:

| Ammonia Concentration Initial (g/l) | Carbon Dioxide Concentration Initial (g/l) | Pulp Density* (Initial) | Tungsten Leached (%) |
|---|---|---|---|
| 50 | 66 | 2 | 98.3 |
| 70 | 88 | 10 | 96.7 |
| 70 | 88 | 20 | 92.4 |
| 95 | 123 | 23 | 89.8 |

*Weight of calcined sample per 100 ml solution.

Part (e)

Samples of tricalcium tungstate weighing 10 g each were added to 500 ml solutions of ammonia which also contained orthophosphate ions. Leaching was carried out for 3 hours at ambient temperature. Further experimental details and the results of the leaching were as follows:

| Run No. | Initial Concentrations: Orthophosphate Ions, moles/l | Initial Concentrations: Ammonia g/l | Tungsten Leached (%) |
|---|---|---|---|
| 1 | 1 | 35 | 16.7* |
| 2 | 3 | 100 | 93.5 |

*Calcium tungstate was present in the residue of Run 1 indicating an insufficient concentration of orthophosphate anion.

EXAMPLE V

A commercial scheelite concentrate containing 76.9% tungsten trioxide was mixed with calcium carbonate and calcined for five hours using the procedure of Example III, part (d). A 100-g sample of the calcined product was added to 500 ml of a solution containing 143.1 g of sodium carbonate. Leaching was carried out at ambient temperature for 3 hours; the solution being stirred during this period. The solution was then filtered and the residue washed with sodium carbonate solution. X-ray fluorescence analysis of the filtrate showed that 88.5% of the tungsten had been leached. X-ray diffraction analysis of the residue showed the presence of unleached tricalcium tungstate.

EXAMPLE VI

A 300-g sample of commercial scheelite concentrate containing 76.9% by weight of tungsten trioxide was mixed with laboratory grade calcium carbonate and calcined as in Example III, part (d). The calcined product was cooled rapidly to ambient temperature under vacuum. The calcined product was then added to 16 liters of ammonia carbonate solution containing initially about 90 g/l of carbon dioxide. The solution was maintained saturated in ammonia by passing ammonia gas through the solution at a rate of 200 $cm^3$/min. The solution also contained about 2.5 kg of alumina spheres having a diameter of 1–2 mm as an abrasion medium. Leaching was carried out for 4.5 hours, the solution being stirred during this period. The solution was then filtered and the filtrate washed. X-ray fluorescence analysis of the filtrate showed that 93.7% of the tungsten had been leached. A caked material had formed on the bottom of the vessel used for the leaching and analysis showed that the tungsten content of the caked material accounted for a major portion of the tungsten not leached into solution. Adequate agitation of the solids in the leaching solution is therefore important.

EXAMPLE VII

A commercial scheelite concentrate of -100 TYLER mesh and containing 75.9% by weight of tungsten trioxide was mixed with laboratory-grade calcium carbonate such that the approximate molar ratio of calcium to tungsten was 3.1:1. Portions of the mixture were calcined at 1200° C in a muffle furnace for different periods of time. The calcined products were leached in ammonium carbonate solution containing initially about 90 g/l of carbon dioxide. About 2 g of calcined product were used per 100 ml of solution. Fine silica sand was added to some of the leach solutions. The leaching solutions were vigorously stirred. After leaching the solutions were filtered and the residues washed. The filtrates were analyzed by X-ray fluorescence. Further experimental conditions and the results obtained were as follows:

| Run | Calcining Time (hours) | Leaching Temp. (° C) | Leaching Time (hours) | Silica Added | Ammonia Concentration Initial (g/l) | Tungsten Leached (%) |
|---|---|---|---|---|---|---|
| 1 | 1 | ambient | 1 | yes | 250 | 88.9 |
| 2 | 4.6 | ambient | 3 | no | 185 | 95.1 |
| 3 | 12 | 50 | 3 | yes | 175* | 78.8 |
| 4 | 4.6 | 50 | 4 | yes | 175* | 86.5 |

*maintained by bubbling ammonia thorugh leach solution.

EXAMPLE VIII

A 327-g sample of a mixture of calcium carbonate and a Bolivian wolframite concentrate containing 62.3% by weight of tungsten trioxide was calcined at 1200° C for 3 hours. A further 56.5 g of calcium carbonate were admixed and the resultant mixture was calcined at 1200° C for a further 3 hours. The overall molar ratio of calcium to tungsten in the calcined product was 5.8:1. A 271.7-g sample of the calcined product was leached for 8 hours at ambient temperature with 2 liters of a solution of ammonium carbonate containing initially about 180 g/l of ammonia and 120 g/l of carbon dioxide. Leaching was carried out in a roll mill jar using a ceramic grinding medium. After leaching the solution was filtered and the residue was washed with ammonium carbonate solution. A portion of the filtrate was steam stripped under reflux at a reflux ratio of 1 for 2 hours and re-filtered to remove a very small quantity of precipitate matter. A portion of the resulting filtrate was evaporated to dryness and the ammonium tungstate obtained was then calcined at 750° C for 2 hours. The resulting tungsten trioxide was lemon yellow in colour. Based on the fraction of the wolframite converted to tungsten trioxide the recovery of tungsten was 94.2%. Analysis of the filtrate obtained after steam stripping by atomic absorption and X-ray fluorescence showed that the purity was greater than 99%.

This above-described procedure was carried out on a semi-continuous basis, in that the product obtained in each step in the process was immediately subjected to the next step in the process.

EXAMPLE IX

The procedure of Example VIII was repeated with a commercial scheelite concentrate of -250 TYLER mesh containing 77.2% by weight of tungsten trioxide. The conversion of tungsten to tungsten trioxide was 96.8%. The tungsten trioxide was lemon yellow in colour.

The ammonium tungstate obtained on evaporating the filtrate obtained after steam stripping was analyzed for impurities. The results of this analysis and the corresponding information for the commercial scheelite concentrate were as follows:

| | Analysis* | |
|---|---|---|
| Element | Scheelite Concentrate | Ammonium Tungstate |
| W | 60.5 | 68.3 |
| Ca | 14.0 | 0.006 |
| Fe | 0.05 | 0.003 |
| Mg | 0.02 | 0.001 |
| Si | 0.69 | 0.23** |
| Mo | <0.005 | <0.002 |
| S | 0.03 | NA |
| K | 0.008 | 0.002 |
| Mn | 0.02 | 0.001 |
| Cu | 0.005 | <0.002 |
| P | 0.08 | 0.013 |
| As | <0.002 | <0.002 |
| Bi | 0.003 | <0.002 |
| Sb | <0.001 | <0.002 |
| N | NA | 5.28 |

NA not analyzed
*Analyses reported in percent by weight
**result may be misleading as experimental procedure carried out in glassware

We claim:

1. A process for the manufacture of a tungstate salt which comprises forming a tri(alkaline earth metal) tungstate from a tungsten composition selected from the group consisting of an alkaline earth metal tungstate, iron tungstate, manganese tungstate and mixtures thereof, by calcining the tungsten composition with an alkaline earth metal donor compound at a temperature in the range of 800° to 1400° C, the donor compound being in excess of the stoichiometric amount required to form the tri(alkaline earth metal) tungstate, treating the tri(alkaline earth metal) tungstate with an aqueous solution containing a sufficient quantity of cations selected from the group consisting of ammonium, sodium and potassium ions and mixtures thereof and anions selected from the group consisting of carbonate, bicarbonate, hydroxide and phosphate ions and mixtures thereof, at a temperature in the range of 20° to 40° C, for a time sufficient for a substantial fraction of the tri(alkaline earth metal) tungstate to react with the cations to form a tungstate salt which is soluble in the solution and to react with the anions to form an alkaline earth metal compound which is insoluble in the solution, and thereafter separating the insoluble matter from the tungstate solution.

2. The process of claim 1 wherein, in the calcining step the tungsten composition is a scheelite ore or concentrate, the alkaline earth metal of the donor compound is comprised essentially of calcium and the tri(alkaline earth metal) tungstate formed is tricalcium tungstate, and in the aqueous treatment the cations are ammonium ions and the anions are selected from the group consisting of carbonate and bicarbonate ions and mixtures thereof.

3. The process of claim 2 wherein the cations and anions, respectively, are formed by passing ammonia and carbon dioxide through the solution.

4. The process of claim 2 wherein the cations and anions are provided by the aqueous solution containing 20 to 30% by weight of ammonium carbonate, based on the weight of the water.

5. The process of claim 2 wherein the alkaline earth metal donor compound is a calcium compound selected from the group consisting of the carbonate, oxide and hydroxide of calcium and mixtures thereof.

6. The process of claim 1 wherein the tri (alkaline earth metal) tungstate is tricalcium tungstate, the cations are sodium ions and the anions are selected from the group consisting of carbonate and bicarbonate ions and mixtures thereof.

7. The process of claim 1 wherein the tungsten composition is in the form of an ore or concentrate thereof.

* * * * *